Sept. 23, 1958     H. A. HARRY     2,853,330
MULTI-RIBBED SEALING STRIP
Filed Aug. 13, 1956     2 Sheets-Sheet 1
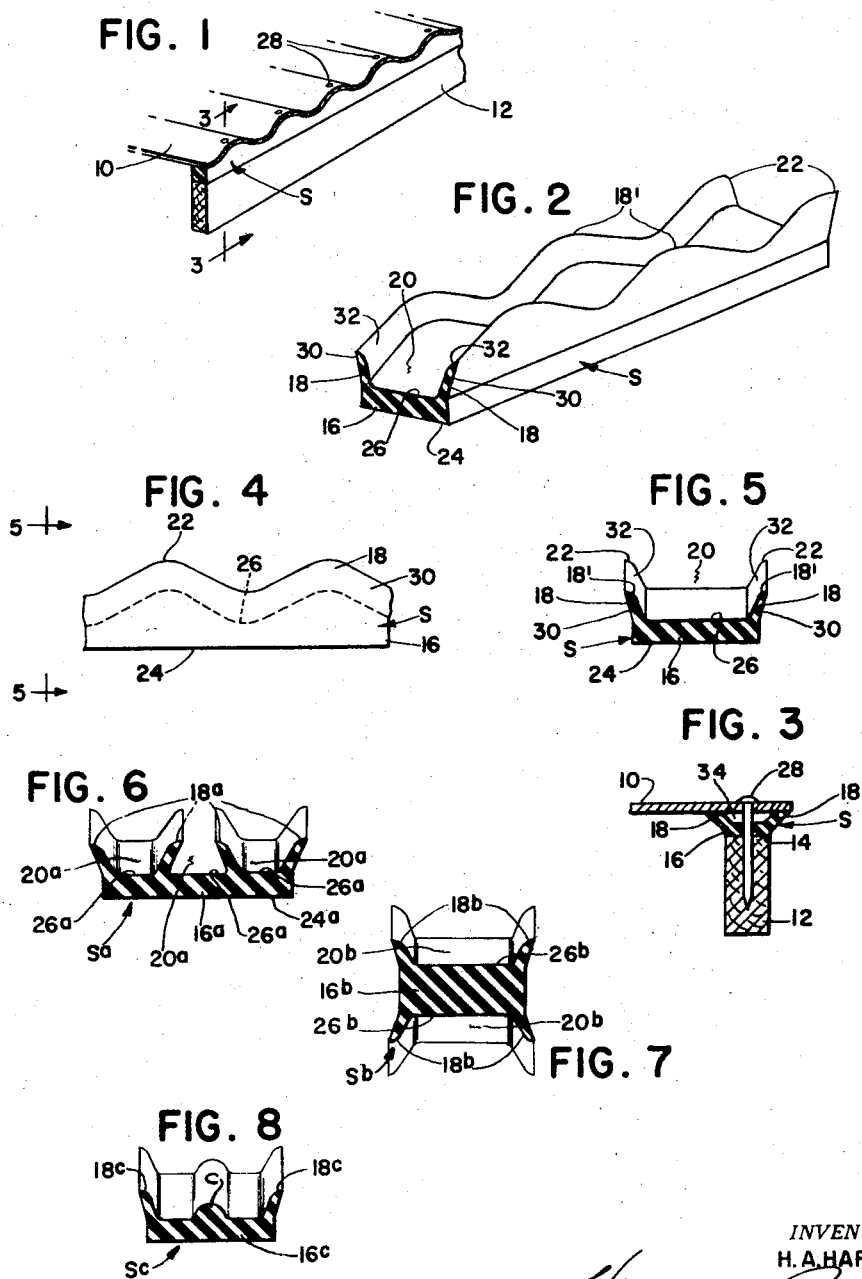

Sept. 23, 1958      H. A. HARRY      2,853,330
MULTI-RIBBED SEALING STRIP
Filed Aug. 13, 1956      2 Sheets-Sheet 2
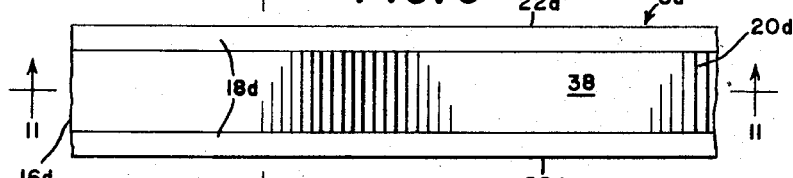
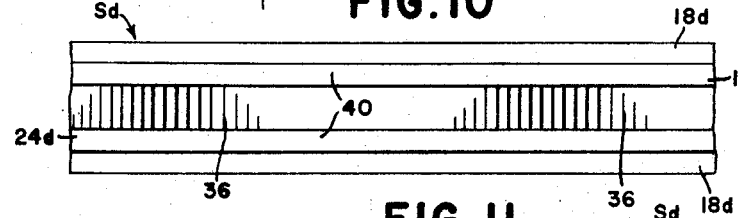
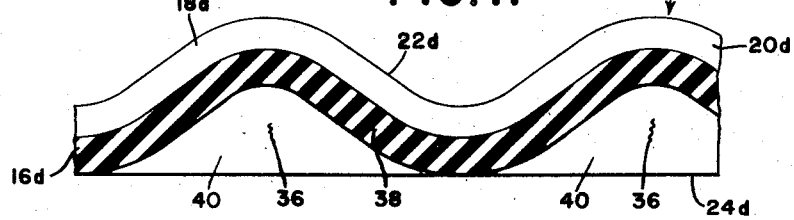
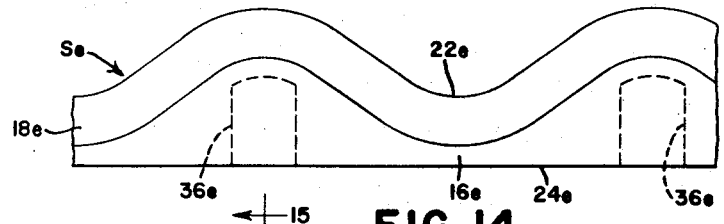
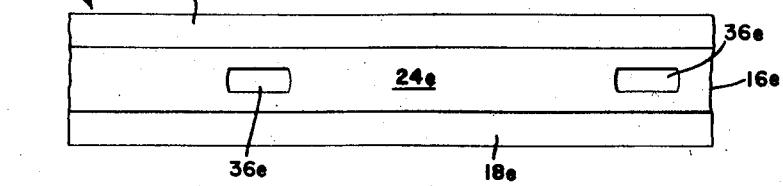
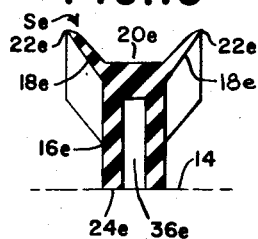
INVENTOR.
H. A. HARRY
BY
ATTORNEY

United States Patent Office 2,853,330
Patented Sept. 23, 1958

2,853,330

MULTI-RIBBED SEALING STRIP

Henry A. Harry, Moline, Ill.

Application August 13, 1956, Serial No. 603,682

6 Claims. (Cl. 288—33)

This invention relates to a sealing strip and more particularly to an improved seal for use in joining corrugated panels and the like to other structural members. The present application is a continuation-in-part of co-pending application Serial No. 558,027, filed January 9, 1956, now abandoned.

In a simple representative structure, straight structural members afford a framework for supporting corrugated panels, whether of sheet metal, glass, plastic, etc., as in roofs, side walls or any other comparable arrangement, and it has been a well-known expedient to utilize a sealing strip of elastomer or equivalent material at the junction of the corrugated surface with the straight supporting surface or edge, the strip having opposite flat and sinuous surfaces to respectively accommodate the straight edge and the corrugations. Because of inevitable inaccuracies in manufacture, lack of uniformity in pitch and/or height of the corrugations results in a slight mis-match between the panel and the strip and a perfect air- and water-tight seal has heretofore been impossible without the additional step of caulking the joint with a suitable cement or mastic.

According to the present invention these problems are eliminated by the improved sealing strip having thereon preferably paired extensions of the sinuous sealing surface, which extensions are materially more flexible than the main body of the strip and thus able to accommodate and conform to discrepancies in the panel, since they may yield and deflect, when joining pressure is applied. Hence, caulking is not required. It is a further feature of the strip that the extensions are so constructed as to be prone to deflect laterally outwardly away from each other, thus affording a still better seal. Further objects reside in modified forms of strips based on the foregoing principles.

It is a significant feature of certain of the modified forms of strips that each has a substantially hollow body, open at least at intervals at its bottom to afford pockets which have the functions of better adherence to a flat surface because of the vacuum-cup effect, increased flexibility and saving of material.

These and other important objects and desirable features inherent in and encompassed by the invention will become apparent as preferred embodiments of the invention are disclosed in the ensuing specification and accompanying sheets of drawings, the several figures of which are described immediately below.

Figure 1 is a fragmentary perspective illustrating a typical panel-seal-support arrangement.

Figure 2 is an enlarged perspective of a portion of one form of sealing strip.

Figure 3 is an enlarged section as seen along the line 3—3 of Figure 1.

Figures 4 and 5 are respectively side and end elevations of the strip of Figure 2.

Figures 6, 7 and 8 are typical sections of modified strip forms.

Figure 9 is a fragmentary top plan view of a form of strip having a pocketed bottom.

Figure 10 is a fragmentary bottom view of the same.
Figure 11 is a section on the line 11—11 of Figure 9.
Figure 12 is a section on the line 12—12 of Figure 9.
Figure 13 is a fragmentary elevation of a still further modified form of pocketed strip.
Figure 14 is a bottom view of the same.
Figure 15 is a section on the line 15—15 of Figure 13.

The basic structure shown in Figure 1 includes a corrugated panel 10 mounted on a structural member or support 12, and a sealing strip S is interposed between the two to afford an air- and water-tight joint. The panel may be of any material, including but not limited to sheet steel, plastic, asbestos, glass, Fiberglas, etc., and the support is representative of a rafter or the like having a flat upper edge 14 on which the strip S rests. The sinuous undersurface of the panel 10 rests on the strip. In this respect it should be noted, here as well as in the appended claims, that such expressions as "top," "bottom," "horizontal," etc. are terms of convenience and not of limitation, because the same principles are involved regardless of whether the structure is horizontal, vertical or inclined.

The strip S (Figures 1–5) is an elongated one-piece member of resilient flexible material such as rubber or other elastomer composition and has a main relatively thick body 16 and a pair of longitudinal wings or extensions 18, spaced apart laterally of the length of the strip and defining between them a longitudinal channel or groove 20, giving the strip a U-shaped section. Each extension has a longitudinally sinuous upper edge 22 conforming to the sinuosity of the panel 10, it being understood that strips are manufactured in different sizes and pitches according to the type of panel with which a particular strip will be used. The body 16 has a flat undersurface 24 and a sinuous top surface 26, which parallels the top edges 22 and which forms the base of the channel 20. When the strip S is installed between the top surface 14 (for example) of the support 12 and the undersurface (for example) of the panel 10, the strip is placed in compression by the force applied when the panel is fastened in place, as by screws or nails as suggested at 28; although, suitable adhesives may be used when applied with adequate pressure. In any event, the salient features of the invention will be the same.

It is characteristic of each extension 18 that it has an outer longitudinal surface 30 and an inner longitudinal surface 32 and these surfaces taper upwardly to feather the extension toward its top edge portion, particularly at 18′, whereby the top edge is somewhat knife-like or materially relatively thinner than the portion of the extension immediately adjoining the main body 16. The inner surfaces 32 also diverge upwardly (or tend to converge downwardly), as do the outer surfaces 30, each relative to the corresponding surface on the other extension, with the result that the extensions flare outwardly. This characteristic, plus the relative thinness and flexibility of the extensions enable them to more readily accommodate themselves to the panel 10, besides which the extensions are prone to deflect laterally outwardly or to spread apart (Figure 3) upon the application thereto of downward pressure. Hence, the extensions avoid inward deflection and cannot overlap each other, which would be detrimental to the seal. Likewise, the extensions cannot deflect in the same lateral direction and hence lateral instability or "wobbling" of the panel is prevented.

The illustration in Figure 3 is somewhat general merely for purposes of disclosure, it being understood that compression by way of the fastener means may be greater or less than that shown, thus either reducing (or even eliminating) or increasing the space as at 34. That is to say, with greater compression, the panel could be made to seat directly on the sinuous top surface 26 and the extensions or wings would be deflected outwardly to their maximum extent. All this depends upon the nature of the panel and the intensity of the seal desired. Of course, the flat undersurface 24 of the strip adequately accommodates itself to the flat surface 14 of the support 12.

In the modified strip Sa of Figure 6, the main body 16a has two pairs of integral extensions 18a, each extension having the same characteristic as the extensions 18. Hence, it is deemed unnecessary to repeat the description in detail. Suffice it to note that the strip Sa is representative of carrying out the principles of the invention in a strip in which the extensions are repeated and paired to form several channels 20a. It is obvious of course that any number of the extensions could be used if desired. Viewed from the side, the strip body has a sinuous upper surface 26a and a flat undersurface 24a, and the edges of the extensions would be sinuous.

Likewise, as in the strip Sb of Figure 7, extensions 18b could project both upwardly and downwardly from the main body 16b, giving the strip an H-shaped section which has upper and lower channels 20b. A strip of this type is used where two corrugated panels are overlapped. It will be understood, of course, that the body 16b has its upper and lower surfaces 26b of sinuous nature, as are the edges of the extensions 18b.

The foregoing principles are applied in the strip Sc of Figure 8, which has, in addition to the body 16c and extensions 18c, a central head or rib C. Otherwise the strip is the same as the strip S.

The modified strip Sd (Figures 9–12) has exactly the same application, as between the sheet 10 and support 12, as the strips described above, with certain additional advantages as will presently appear.

In general respects, the strip Sd has the fundamental components of the strip S, for example, having a base or body 16d, wings 18d having sinuous free edges 22d and defining a sinuous channel 20d, and an undersurface 24d. The basic difference is that the strip Sd is pocketed or cupped at its underportion, as by a plurality of vacuum pockets or cups 36. In the illustrated instance, the molding of the strip accomplishes the pockets by giving the channel 20d a sinuous wall-like bottom 38 of uniform thickness, as well as opposite side wall portions 40. When the strip Sd is applied between the sheet 10 and support 12 as in Figure 3, initial pressure on the strip exhausts the pockets 36 of air and the resulting vacuum causes the strip to adhere to the top surface 14 of the support, which is shown schematically in Figure 12. As already pointed out, the pocketed strip has the further advantages of saving material and increasing the flexibility of the strip.

Exactly the same principles but in a somewhat different degree are present in the other pocketed strip Se (Figures 13–15). The basic components of the strip are again presented, such as a base 16a having an undersurface 24e, and wings 18e having sinuous upper edges 22e and defining a sinuous channel 20e. In this instance, the pockets or cups, at 36e, are smaller than those at 36 and have a different configuration.

Advantages and features of the invention, other than those outlined herein, will undoubtedly occur to those versed in the art, as will further variations in the types of sealing strips disclosed, all of which may be achieved without departing from the spirit and scope of the invention.

What is claimed is:

1. A sealing strip for use in the assembly of a corrugated panel to a straight support disposed transverse to the corrugations in the panel, comprising: an elongated member of resilient flexible material adapted to lie along the support and having an undersurface adapted to rest on said support, said member having an elongated relatively thick body of which said undersurface forms the bottom, and a pair of longitudinal extensions integral with and rising from the body in laterally spaced apart and laterally outwardly flaring relation to define between them an upwardly facing channel, said extensions respectively having inner upwardly divergent longitudinal surfaces defining the sides of said channel and said body having a top surface between said extensions and defining a floor of said channel, said top surface being longitudinally sinuous on the order of the pitch and shape of the panel corrugations, each extension having a longitudinal outer surface directed upwardly and laterally outwardly in outwardly tapering relation to the associated longitudinal inner surface to provide on said extension a longitudinal feathered edge, each such edge being longitudinally sinuous on the order of the pitch and shape of said corrugations, and each extension being thereby relatively thin and considerably more flexible than the body and thus prone to deflect laterally outwardly and downwardly in response to compression of said strip between the panel and support, whereby the deflected extensions adapt themselves to peculiarities and irregularities in the corrugations of the panel.

2. The invention defined in claim 1, in which: the body has a plurality of pockets therein opening downwardly to said undersurfaces and bordered by flat portions of said undersurface to afford vacuum chambers facilitating adherence of the strip to the support.

3. The invention defined in claim 2, in which: each pocket is directly below a high portion of the sinuous top surface.

4. The invention defined in claim 1, in which: the undersurface of the body has a pair of laterally spaced apart coplanar under edge portions adapted to flatly contact and rest on the support, and a central undersurface midportion between said edge portions and concentrically sinuous with the top surface, the low portion of said sinuous midportion being coplanar with said edge portions so as to afford a plurality of vacuum pockets facilitating adherence of the strip to the support.

5. The invention defined in claim 1, in which: the body includes a second pair of extensions having the same characteristics as and affording a channel like those first mentioned.

6. The invention defined in claim 1, in which: a longitudinal central bead rises from and runs lengthwise of the channel at a level below that of the top edges of the extensions.

References Cited in the file of this patent

UNITED STATES PATENTS

| | | |
|---|---|---|
| 1,799,904 | Howlett et al. | Apr. 7, 1931 |
| 1,931,315 | Brook | Oct. 17, 1933 |
| 2,021,929 | Voigt | Nov. 26, 1935 |
| 2,122,608 | Harlow | July 5, 1938 |
| 2,602,201 | Ofeldt | July 8, 1952 |
| 2,708,016 | Penton | May 10, 1955 |

FOREIGN PATENTS

| | | |
|---|---|---|
| 508,668 | Great Britain | July 4, 1939 |
| 711,358 | Germany | Sept. 30, 1941 |